United States Patent
Lyons et al.

(10) Patent No.: US 8,309,641 B2
(45) Date of Patent: Nov. 13, 2012

(54) CURABLE FLUOROELASTOMER COMPOSITIONS

(75) Inventors: Donald F. Lyons, Wilmington, DE (US); Tsuyoshi Kawai, Tochigi (JP)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/192,554

(22) Filed: Jul. 28, 2011

(65) Prior Publication Data

US 2012/0190798 A1   Jul. 26, 2012

Related U.S. Application Data

(60) Provisional application No. 61/373,446, filed on Aug. 13, 2010.

(51) Int. Cl.
*C08K 3/10* (2006.01)
*C08K 5/14* (2006.01)
*C08K 5/053* (2006.01)
*C08F 2/00* (2006.01)
*C08F 14/18* (2006.01)

(52) U.S. Cl. ........ 524/408; 524/401; 523/457; 523/514; 526/206; 526/242

(58) Field of Classification Search ............ 524/401, 524/408, 462, 463; 523/457, 514; 526/206, 526/242
See application file for complete search history.

(56) References Cited

U.S. PATENT DOCUMENTS

| | | | |
|---|---|---|---|
| 3,876,654 A | 4/1975 | Pattison et al. | |
| 4,233,421 A | 11/1980 | Worm | |
| 4,250,278 A | 2/1981 | Suzuki et al. | |
| 4,259,463 A | 3/1981 | Moggi | |
| 4,882,390 A | 11/1989 | Kolb | |
| 4,912,171 A | 3/1990 | Grootaert | |
| 4,957,975 A * | 9/1990 | Carlson et al. | 525/340 |
| 5,151,492 A * | 9/1992 | Abe et al. | 526/206 |
| 5,591,804 A | 1/1997 | Coggio et al. | |
| 5,648,429 A | 7/1997 | Chiodini | |
| 6,887,959 B2 | 5/2005 | Schmiegel et al. | |
| 7,125,598 B2 | 10/2006 | Yamato et al. | |
| 7,291,399 B2 | 11/2007 | Kaplan et al. | |
| 2002/0013438 A1 * | 1/2002 | Grootaert et al. | 526/242 |
| 2007/0021551 A1 | 1/2007 | Malvasi et al. | |

FOREIGN PATENT DOCUMENTS

| | | |
|---|---|---|
| EP | 0868447 B1 | 2/2000 |
| EP | 1513027 A1 | 3/2005 |
| EP | 1726627 A2 | 11/2006 |

OTHER PUBLICATIONS

International Serch Report, Korean Intellectual Property Office Daejeon, Rok, in PCT/US2011/047740, PCT Counterpart of the Present U.S. Appl. 13/192,554.

* cited by examiner

*Primary Examiner* — Karuna P Reddy

(57) ABSTRACT

Disclosed herein is a curable composition comprising a curable fluoroelastomer, a curative and an acid acceptor selected from the group consisting of a hydrous bismuth oxide nitrate compound and bismuth oxide. Cured articles made therefrom are resistant to volume swell in acids, coolant and in biofuel.

6 Claims, No Drawings

CURABLE FLUOROELASTOMER COMPOSITIONS

CROSS-REFERENCE TO RELATED APPLICATIONS

This application claims the benefit of U.S. Provisional Application No. 61/373,446 filed Aug. 13, 2010.

FIELD OF THE INVENTION

This invention relates to curable fluoroelastomer compositions comprising i) a fluoroelastomer, ii) a curative and iii) an acid acceptor selected from the group consisting of a hydrous bismuth oxide nitrate compound and bismuth oxide.

BACKGROUND OF THE INVENTION

Fluoroelastomers having excellent heat resistance, oil resistance, and chemical resistance have been used widely for sealing materials, containers and hoses. Examples of fluoroelastomers include copolymers comprising units of vinylidene fluoride ($VF_2$) and units of at least one other copolymerizable fluorine-containing monomer such as hexafluoropropylene (HFP), tetrafluoroethylene (TFE), chlorotrifluoroethylene (CTFE), vinyl fluoride (VF), and a fluorovinyl ether such as a perfluoro(alkyl vinyl ether) (PAVE). Specific examples of PAVE include perfluoro(methyl vinyl ether), perfluoro(ethyl vinyl ether) and perfluoro(propyl vinyl ether). Other fluoroelastomers include copolymers comprising units of TFE and units of perfluoro(methyl vinyl ether).

In order to fully develop physical properties such as tensile strength, elongation, and compression set, elastomers must be cured, i.e. vulcanized or crosslinked. In the case of fluoroelastomers, this is generally accomplished by mixing uncured polymer (i.e. fluoroelastomer gum) with a polyfunctional curing agent and heating the resultant mixture, thereby promoting chemical reaction of the curing agent with active sites along the polymer backbone or side chains. Interchain linkages produced as a result of these chemical reactions cause formation of a crosslinked polymer composition having a three-dimensional network structure. Commonly employed curing agents for fluoroelastomers include the combination of an organic peroxide with a multifunctional coagent, or difunctional nucleophilic curatives such as polyhydroxy compounds or diamines. Nucleophilic curatives require an acid acceptor (e.g. a divalent metal oxide) to be activated.

However, cured fluoroelastomer articles containing acid acceptors may exhibit unacceptably high volume swell, e.g. 50-200 vol. %, that can lead to seal failure, when seals are exposed to certain chemicals such as aqueous acids, coolants or biofuels (e.g. biodiesel or bioalcohol) for long periods of time or at elevated temperatures.

SUMMARY OF THE INVENTION

In one aspect, the present invention provides a curable fluoroelastomer composition comprising:
A) a curable fluoroelastomer;
B) a curative; and
C) an acid acceptor selected from the group consisting of a hydrous bismuth oxide nitrate compound and bismuth oxide.

DETAILED DESCRIPTION OF THE INVENTION

The present invention is directed to curable fluoroelastomer compositions that, when cured with either a polyhydroxy or diamine curative or with an organic peroxide, have reduced volume swell in acids (such as in motor vehicle blow-by gas condensates or exhaust gas condensates) and in coolants and biofuel. Such fluororubber articles have surprisingly low volume swell, i.e. less than 10 vol. %, preferably less than 5 vol. %, when exposed to dilute acids, coolant fluids or to biofuel for long periods of time and/or at elevated temperatures. The cured fluoroelastomer compositions have a variety of end uses, including air management systems, coolant systems and in fuel management systems having at least one fluororubber article in contact with acids, coolant fluids and/or biofuel.

By the term "air management system" is meant main components such as the air filter, turbocharger, intercooler, air intake manifold, and exhaust gas recirculation cooler located in motor vehicles (e.g. trucks, cars, boats). Specific elements connecting these components of air management systems include, but are not limited to air ducts, turbocharger hoses, positive crankcase ventilation hoses and seals, intercooler hoses and seals, quick connector seals and o-rings, air intake manifold seals, oxygen sensor hoses and seals, diesel particle filter sensor hoses, and other sensor hoses and seals.

By the term "coolant system" is meant equipment that is in contact with radiator fluid which is typically an aqueous blend of glycol, e.g. diethylene glycol or propylene glycol and corrosion inhibitors.

By the term "fuel management system" is meant equipment employed in the manufacture, storage, transportation and supply, metering and control of biofuel. Fuel management systems include those contained in biofuel manufacturing plants, motor vehicles (e.g. trucks, cars, boats), stationary biofuel powered devices (e.g. electrical generators, portable pumping stations) and those associated with biofuel transportation, storage and dispensing. Specific elements of fuel management systems include, but are not limited to fuel tanks, filler neck hoses, fuel tank cap seals, fuel line hoses and tubing, valves, diaphragms, fuel sender seals and fuel injector components, o-rings, seals and gaskets. Any or all of these elements may comprise one or more fluororubber articles that contact biofuel. Cured fluororubber articles include, but are not limited to seals, gaskets, o-rings, tubing, the fuel contact layer of multilayer hoses, valve packings, diaphragms, and tank liners.

By "biodiesel fuel" is meant a fuel suitable for use in a compression ignition (diesel) engine compromising one or more fatty acid alkyl esters (FAAE) of biological origin (i.e. derived from animals or plants). These FAAEs are typically methyl or ethyl esters of fatty acids derived from vegetable oils or animal fats. Specific examples include rape seed oil methyl ester (RME), soybean oil methyl ester (SME), palm kernel oil methyl ester (PME) and the like. Also included are blends of these FAAE based materials with conventional petroleum based diesel fuel. Petroleum diesel/biodiesel blends are conventionally denoted as Bxx fuels where "xx" is the volume percent of the FAAE based biodiesel in the blend. For example, B100 denotes a biodiesel fuel containing no deliberately added petroleum component. B20 denotes biodiesel fuel containing 20 vol. % of a B100 fuel and 80 vol. % of petroleum diesel fuel.

By "bioalcohol fuel" is meant a fuel suitable for use in a gasoline engine compromising one or more alcohols of biological origin (i.e. derived from animals or plants). These bioalcohols are typically methanol, ethanol, or butanol. Petroleum gasoline/bioalcohol blends are conventionally denoted as Mxx or Exx fuels where "xx" is the volume percent of the bioalcohol contained in the blend. For example, E100 denotes a bioalcohol fuel containing no deliberately added petroleum component. E30 denotes bioalcohol fuel containing 30 vol. % of an E100 fuel and 70 vol. % of petroleum gasoline fuel.

Fluoroelastomers that are suitable for use in this invention are those that are polyhydroxy or diamine curable and those that are curable by an organic peroxide and multifunctional coagent.

By "polyhydroxy curable" is meant fluoroelastomers which are known to crosslink with polyhydroxy curatives such as bisphenol AF. By "diamine curable" is meant fluoroelastomers which are known to crosslink with diamine curatives such as hexamethylene diamine carbamate. Such fluoroelastomers include those having a plurality of carbon-carbon double bonds along the main elastomer polymer chain and also fluoroelastomers which contain sites that may be readily dehydrofluorinated. The latter fluoroelastomers include, but are not limited to those which contain adjacent copolymerized units of vinylidene fluoride ($VF_2$) and hexafluoropropylene (HFP) as well as fluoroelastomers which contain adjacent copolymerized units of $VF_2$ (or tetrafluoroethylene) and a fluorinated comonomer having an acidic hydrogen atom such as 2-hydropentafluoropropylene; 1-hydropentafluoropropylene; trifluoroethylene; 2,3,3,3-tetrafluoropropene; or 3,3,3-trifluoropropene. Preferred polyhydroxy curable fluoroelastomers include the copolymers of i) vinylidene fluoride with hexafluoropropylene and, optionally, tetrafluoroethylene (TFE); ii) vinylidene fluoride with a perfluoro(alkyl vinyl ether) such as perfluoro(methyl vinyl ether), 2-hydropentafluoropropylene and optionally, tetrafluoroethylene; iii) tetrafluoroethylene with propylene and 3,3,3-trifluoropropene; iv) tetrafluoroethylene, perfluoro(methyl vinyl ether) and hexafluoro-2-(pentafluorophenoxy)-1-(trifluorovinyloxy) propane, and v) ethylene with tetrafluoroethylene, perfluoro(methyl vinyl ether) and 3,3,3-trifluoropropylene.

In addition to the fluoroelastomer, polyhydroxy curable compositions of this invention contain a polyhydroxy cure system, meaning a polyhydroxy curative and a vulcanization (or curing) accelerator.

The curable compositions contain 0.4 to 4 parts by weight (preferably 1 to 2.5 parts) of polyhydroxy curing agent (or a derivative thereof) per 100 parts by weight fluoroelastomer, i.e. 0.4-4 phr (preferably 1-2.5 phr). Typical polyhydroxy cross-linking agents include di-, tri-, and tetrahydroxybenzenes, naphthalenes, and anthracenes, and bisphenols of the formula

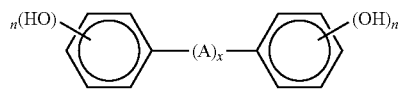

where A is a difunctional aliphatic, cycloaliphatic, or aromatic radical of 1-13 carbon atoms, or a thio, oxy, carbonyl, sulfinyl, or sulfonyl radical; A may optionally be substituted with at least one chlorine or fluorine atom; x is 0 or 1; n is 1 or 2; and any aromatic ring of the polyhydroxylic compound may optionally be substituted with at least one chlorine or fluorine atom, an amino group, a —CHO group, or a carboxyl or acyl radical. Preferred polyhydroxy compounds include hexafluoroisopropylidene-bis(4-hydroxy-benzene) (i.e. bisphenol AF or BPAF); 4,4'-isopropylidene diphenol (i.e. bisphenol A); 4,4'-dihydroxydiphenyl sulfone; and diaminobisphenol AF. Referring to the bisphenol formula shown above, when A is alkylene, it can be for example methylene, ethylene, chloroethylene, fluoroethylene, difluoroethylene, propylidene, isopropylidene, tributylidene, heptachlorobutylidene, heptafluorobutylidene, pentylidene, hexylidene, and 1,1-cyclohexylidene. When A is a cycloalkylene radical, it can be for example 1,4-cyclohexylene, 2-chloro-1,4-cyclohexylene, cyclopentylene, or 2-fluoro-1,4-cyclohexylene. Further, A can be an arylene radical such as m-phenylene, p-phenylene, o-phenylene, methylphenylene, dimethylphenylene, 1,4-naphthylene, 3-fluoro-1,4-naphthylene, and 2,6-naphthylene. Polyhydroxyphenols of the formula

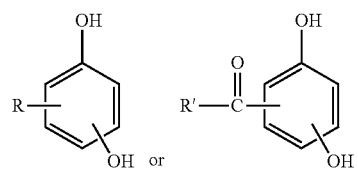

where R is H or an alkyl group having 1-4 carbon atoms or an aryl group containing 6-10 carbon atoms and R' is an alkyl group containing 1-4 carbon atoms also act as effective crosslinking agents. Examples of such compounds include hydroquinone, catechol, resorcinol, 2-methylresorcinol, 5-methyl-resorcinol, 2-methylhydroquinone, 2,5-dimethylhydroquinone, 2-t-butyl-hydroquinone; and such compounds as 1,5-dihydroxynaphthalene and 2,6-dihydroxynaphthalene.

Additional polyhydroxy curing agents include alkali metal salts of bisphenol anions, quaternary ammonium salts of bisphenol anions, tertiary sulfonium salts of bisphenol anions and quaternary phosphonium salts of bisphenol anions. Specific examples include the disodium salt of bisphenol AF, the dipotassium salt of bisphenol AF, the monosodium monopotassium salt of bisphenol AF and the benzyltriphenylphosphonium salt of bisphenol AF.

Quaternary ammonium and phosphonium salts of bisphenol anions are discussed in U.S. Pat. Nos. 4,957,975 and 5,648,429. Bisphenol AF salts (1:1 molar ratio) with quaternary ammonium ions of the formula $R_1R_2R_3R_4N^+$, wherein $R_1$-$R_4$ are $C_1$-$C_8$ alkyl groups and at least three of $R_1$-$R_4$ are $C_3$ or $C_4$ alkyl groups are preferred. Specific examples of these preferred compositions include the 1:1 molar ratio salts of tetrapropyl ammonium-, methyltributylammonium- and tetrabutylammonium bisphenol AF. Such salts may be made by a variety of methods. For instance a methanolic solution of bisphenol AF may be mixed with a methanolic solution of a quaternary ammonium salt, the pH is then raised with sodium methoxide, causing an inorganic sodium salt to precipitate. After filtration, the tetraalkylammonium/BPAF salt may be isolated from solution by evaporation of the methanol. Alternatively, a methanolic solution of tetraalkylammonium hydroxide may be employed in place of the solution of quaternary ammonium salt, thus eliminating the precipitation of an inorganic salt and the need for its removal prior to evaporation of the solution.

In addition, derivatized polyhydroxy compounds such as mono- or diesters, and trimethylsilyl ethers are useful crosslinking agents. Examples of such compositions include, but are not limited to resorcinol monobenzoate, the diacetate of bisphenol AF, the diacetate of sulfonyl diphenol, and the diacetate of hydroquinone.

Vulcanization accelerators (also referred to as cure accelerators) which may be used in the curable fluoroelastomer compositions include tertiary sulfonium salts such as $[(C_6H_5)_2S^+(C_6H_{13})][Cl]^-$, and $[(C_6H_{13})_2S(C_6H_5)]^+$ $[CH_3CO_2]^-$ and quaternary ammonium, phosphonium, arsonium, and stibonium salts of the formula $R_5R_6R_7R_8Y^+ X^-$, where Y is phosphorous, nitrogen, arsenic, or antimony; $R_5$, $R_6$, $R_7$, and $R_8$ are individually $C_1$-$C_{20}$ alkyl, aryl, aralkyl, alkenyl, and the chlorine, fluorine, bromine, cyano, —OR, and —COOR substituted analogs thereof, with R being $C_1$-$C_{20}$ alkyl, aryl, aralkyl, alkenyl, and where X is halide, hydroxide, sulfate, sulfite, carbonate, pentachlorothiophenolate, tetrafluoroborate, hexafluorosilicate, hexafluorophosphate, dimethyl phosphate, and $C_1$-$C_{20}$ alkyl, aryl, aralkyl, and alkenyl carboxylates and dicarboxylates. Particularly preferred are benzyltri-phenylphosphonium chloride, benzyltriphenylphosphonium bromide, tetrabutylammonium hydrogen sulfate, tetrabutylammonium hydroxide, tetrapropylammonium hydroxide, tetrabutylammonium bromide, tributylallylphosphonium chloride, tributyl-2-methoxypropylphosphonium chloride, 1,8-diazabicyclo[5.4.0]undec-7-ene, and benzyldiphenyl(dimethylamino) phosphonium chloride. Other useful accelerators include methyltrioctylammonium chloride, methyltributylammonium chloride, tetrapropylammonium chloride, benzyltrioctylphosphonium bromide, benzyltrioctylphosphonium chloride, methyltrioctylphosphonium acetate, tetraoctylphosphonium bromide, methyltriphenylarsonium tetrafluoroborate, tetraphenylstibonium bromide, 4-chlorobenzyltriphenyl phosphonium chloride, 8-benzyl-1,8-diazabicyclo(5.4.0)-7-undecenonium chloride, diphenylmethyltriphenylphosphonium chloride, allyltriphenyl-phosphonium chloride, tetrabutylphosphonium bromide, m-trifluoromethyl-benzyltrioctylphosphonium chloride, and other quaternary compounds disclosed in U.S. Pat. Nos. 5,591,804; 4,912,171; 4,882,390; 4,259,463; 4,250,278 and 3,876,654. The amount of accelerator used is between 0.05 and 2 parts by weight per hundred parts by weight fluoroelastomer (0.05-2 phr). Preferably, 0.1 to 1.0 parts accelerator per hundred parts fluoroelastomer is used.

By "peroxide curable" is meant fluoroelastomers that contain Br or I cure sites along the polymer chain, at chain ends or in both locations.

Cure sites along the fluoroelastomer chain are typically due to copolymerized cure site monomers that contain bromine or iodine atoms. Examples of suitable cure site monomers include, but are not limited to: i) bromine-containing olefins; ii) iodine-containing olefins; iii) bromine-containing vinyl ethers; and iv) iodine-containing vinyl ethers.

Brominated cure site monomers may contain other halogens, preferably fluorine. Examples of brominated olefin cure site monomers are $CF_2$=$CFOCF_2CF_2CF_2OCF_2CF_2Br$; bromotrifluoroethylene; 4-bromo-3,3,4,4-tetrafluorobutene-1 (BTFB); and others such as vinyl bromide, 1-bromo-2,2-difluoroethylene; perfluoroallyl bromide; 4-bromo-1,1,2-trifluorobutene-1; 4-bromo-1,1,3,3,4,4,-hexafluorobutene; 4-bromo-3-chloro-1,1,3,4,4-pentafluorobutene; 6-bromo-5,5,6,6-tetrafluorohexene; 4-bromoperfluorobutene-1 and 3,3-difluoroallyl bromide. Brominated vinyl ether cure site monomers useful in the invention include 2-bromo-perfluoroethyl perfluorovinyl ether and fluorinated compounds of the class $CF_2Br$—$R_f$—O—CF=$CF_2$($R_f$ is a perfluoroalkylene group), such as $CF_2BrCF_2O$—CF=$CF_2$, and fluorovinyl ethers of the class ROCF=CFBr or ROCBr=$CF_2$ (where R is a lower alkyl group or fluoroalkyl group) such as $CH_3OCF$=CFBr or $CF_3CH_2OCF$=CFBr.

Suitable iodinated cure site monomers include iodinated olefins of the formula: CHR=CH—Z—$CH_2$CHR—I, wherein R is —H or —$CH_3$; Z is a $C_1$-$C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: I($CH_2CF_2CF_2$)$_n$OCF=$CF_2$ and I$CH_2CF_2O$[CF($CF_3$)$CF_2O$]$_n$CF=$CF_2$, and the like, wherein n=1-3, such as disclosed in U.S. Pat. No. 5,717,036. In addition, suitable iodinated cure site monomers including iodoethylene, 4-iodo-3,3,4,4-tetrafluorobutene-1 (ITFB); 3-chloro-4-iodo-3,4,4-trifluorobutene; 2-iodo-1,1,2,2-tetrafluoro-1-(vinyloxy)ethane; 2-iodo-1-(perfluorovinyloxy)-1,1,-2,2-tetrafluoroethylene; 1,1,2,3,3,3-hexafluoro-2-iodo-1-(perfluorovinyloxy)propane; 2-iodoethyl vinyl ether; 3,3,4,5,5,5-hexafluoro-4-iodopentene; and iodotrifluoroethylene are disclosed in U.S. Pat. No. 4,694,045. Allyl iodide and 2-iodo-perfluoroethyl perfluorovinyl ether are also useful cure site monomers.

Additionally, iodine-containing endgroups, bromine-containing endgroups or mixtures thereof may optionally be present at one or both of the fluoroelastomer polymer chain ends as a result of the use of chain transfer or molecular weight regulating agents during preparation of the fluoroelastomers. The amount of chain transfer agent, when employed, is calculated to result in an iodine or bromine level in the fluoroelastomer in the range of 0.005-5 wt. %, preferably 0.05-3 wt. %.

Examples of chain transfer agents include iodine-containing compounds that result in incorporation of a bound iodine atom at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,6-diiodoperfluorohexane; 1,3-diiodo-2-chloroperfluoropropane; 1,2-di(iodofluoromethyl)-perfluorocyclobutane; monoiodoperfluoroethane; monoiodoperfluorobutane; 2-iodo-1-hydroperfluoroethane, etc. Also included are the cyano-iodine chain transfer agents disclosed in European Patent 0868447A1. Particularly preferred are diiodinated chain transfer agents.

Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Organic peroxides suitable for use in the compositions of the invention include, but are not limited to 1,1-bis(t-butylperoxy)-3,5,5-trimethylcyclohexane; 1,1-bis(t-butylperoxy) cyclohexane; 2,2-bis(t-butylperoxy)octane; n-butyl-4,4-bis (t-butylperoxy)valerate; 2,2-bis(t-butylperoxy)butane; 2,5-dimethylhexane-2,5-dihydroxyperoxide; di-t-butyl peroxide; t-butylcumyl peroxide; dicumyl peroxide; alpha, alpha'-bis(t-butylperoxy-m-isopropyl)benzene; 2,5-dimethyl-2,5-di(t-butylperoxy)hexane; 2,5-dimethyl-2,5-di(t-butylperoxy) hexene-3; benzoyl peroxide, t-butylperoxybenzene; 2,5-dimethyl-2,5-di(benzoylperoxy)-hexane; t-butylperoxymaleic acid; and t-butylperoxyisopropylcarbonate. Preferred examples of organic peroxides include 2,5-dimethyl-2,5-di(t-butylperoxy)hexane, dicumyl peroxide, and alpha, alpha'-bis(t-butylperoxy-m-isopropyl)benzene. The amount compounded is generally in the range of 0.05-5 parts by weight, preferably in the range of 0.1-3 parts by weight per 100 parts by weight of the fluoroelastomer. This particular range is selected because if the peroxide is present in an amount of less than 0.05 parts by weight, the vulcanization rate is insufficient and causes poor mold release. On the other hand, if the peroxide is present in amounts of greater than 5 parts by weight, the compression set of the cured polymer becomes unacceptably high. In addition, the organic peroxides may be used singly or in combinations of two or more types.

Coagents employed in the curable compositions of this invention are polyfunctional unsaturated compounds such as triallyl cyanurate, trimethacryl isocyanurate, triallyl isocyanurate, trimethallyl isocyanurate, triacryl formal, triallyl trimellitate, N,N'-m-phenylene bismaleimide, diallyl phthalate, tetraallylterephthalamide, tri(diallylamine)-s-triazine, triallyl phosphite, bis-olefins and N,N-diallylacrylamide. The amount compounded is generally in the range of 0.1-10 parts by weight per 100 parts by weight of the fluoroelastomer. This particular concentration range is selected because if the coagent is present in amounts less than 0.1 part by weight, crosslink density of the cured polymer is unacceptable. On the other hand, if the coagent is present in amounts above 10 parts by weight, it blooms to the surface during molding, resulting in poor mold release characteristics. The preferable range of coagent is 0.2-6 parts by weight per 100 parts by weight fluoroelastomer. The unsaturated compounds may be used singly or as a combination of two or more types.

Such peroxide curable fluoroelastomer compositions often contain acid acceptors, particularly when the cured compositions will be used in high temperature end use applications.

The curable compositions of the invention also contain between 1 to 60 parts by weight (preferably 4 to 40 parts) of at least one acid acceptor selected from the group consisting of a hydrous bismuth oxide nitrate and bismuth oxide, per 100 parts by weight fluoroelastomer. The bismuth compound acts as both an acid acceptor in order to facilitate the curing (crosslinking) reaction and as an anion exchange compound for scavenging any acidic substances such as HF or carboxylic acids. Suitable hydrous bismuth oxide nitrate compounds include those of the formula $Bi_6O_6(OH)_x(NO_3)_{6-x} \cdot nH_2O$ wherein $3.5 \times 5.5$ and n is 0 or a positive number (JP Sho 63[1988]-60112). Other suitable compounds are those of formula $Bi(OH)_x(NO_3)_y \cdot nH_2O$ wherein $x+y=3$, $x<3$, and $y<0.5$ and n is 0 or a positive number (WO 2008/062723). Such compounds are available commercially from Toagosei Chemical Industry Co., Ltd. as IXE-500, IXE-530 and IXE-550 inorganic anion exchange powder. Bismuth subnitrate may also be employed. The preferred bismuth oxide is precipitated $Bi_2O_3$.

The fluoroelastomer, curative, acid acceptor and any other ingredients are generally incorporated into a curable composition by means of an internal mixer or rubber mill. The resulting composition may then be shaped (e.g. molded or extruded) and cured to form a fluororubber article. Curing typically takes place at about 150°-200° C. for 1 to 60 minutes. Conventional rubber curing presses, molds, extruders, and the like provided with suitable heating and curing means can be used. Also, for optimum physical properties and dimensional stability, it is preferred to carry out a post curing operation wherein the molded or extruded fluororubber article is heated in an oven or the like for an additional period of about 1-48 hours, typically from about 180°-275° C., generally in an air atmosphere.

Another aspect of the present invention is a method for reducing the volume swell of cured fluororubber articles in acids or in biofuel wherein the cured articles are made from the above-described curable compositions. Fluororubber articles produced by this method have volume swells less than 10 vol. %, preferably less than 5 vol. %, when exposed to 70/30/1 volume ratio petroleum diesel/RME biodiesel fuel/water at 125° C. for 672 hours.

EXAMPLES

Test Methods

Volume Swell (%) after immersion in biodiesel was determined by ASTM D471-96 on standard ASTM D471 coupons. The coupons were prepared from cured fluororubber slabs and immersed in biodiesel fuel in a sealed Parr vessel at 120° C. for the times noted in the Examples. Fuel was replaced with fresh fuel on a weekly basis.

Metal Corrosion was determined by placing test pieces of cured fluororubber slabs between two plates of SPCC cold rolled steel and heating to 250° C. for 168 hours. Corrosion of the metal plates was determined by visual examination.

The invention is further illustrated by, but is not limited to, the following examples.

Fluoroelastomer FKM1 employed in the examples was Viton® AL-600, a copolymer of vinylidene fluoride, hexafluoropropylene and tetrafluoroethylene, available from DuPont.

Fluoroelastomer FKM2 employed in the examples was Viton® GAL-200S, a copolymer of vinylidene fluoride, hexafluoropropylene and tetrafluoroethylene containing iodine cure sites, available from DuPont.

Fluoroelastomer FKM3 employed in the examples was Viton® GF-600S, a copolymer of vinylidene fluoride, hexafluoropropylene and tetrafluoroethylene containing iodine cure sites, available from DuPont.

Example 1 and Comparative Example A

Curable compositions for Example 1 and Comparative Example A were made by compounding the ingredients in an internal laboratory mixer and sheet off mill. Formulations are shown in Table I.

The compositions were molded into slabs (for volume swell testing) and pellets and press cured at 160° C. for 15 minutes.

Coupons made from cured slabs were exposed to a biodiesel fuel mixture of 70/30/1 volume ratio petroleum diesel/RME (rape seed oil methyl ester)/water at 125° C. for the time indicated in a closed container. Results are shown in Table I. Other coupons were exposed to an acid mixture (100 ppm sulfuric, 100 ppm nitric, 100 ppm hydrochloric, 1000 ppm acetic and 1000 ppm formic acid) at 60° C. for the indicated time.

TABLE I

|  | Ex. 1 | Comp. Ex. A |
|---|---|---|
| Ingredient, phr[1] |  |  |
| FKM1 | 100 | 100 |
| Ca(OH)$_2$ | 0 | 6 |
| MgO[2] | 0 | 3 |
| IXE-550[3] | 15 | 0 |
| Carbon black N990 | 30 | 30 |
| VC50[4] | 2.5 | 2.5 |
| VPA #2[5] | 0.5 | 0.5 |
| % Volume swell in biodiesel |  |  |
| 72 hours | 3.0 | 4.8 |
| 168 hours | 2.7 | 29.9 |
| 336 hours | 3.5 | 24.6 |
| 672 hours | 3.8 | 44.3 |
| 1008 hours | 3.7 | 65.6 |
| Volume swell in acid mixture |  |  |
| 24 hours | 0.1 | 1.8 |
| 72 hours | 0.7 | 5.8 |
| 168 hours | 0.7 | 10.9 |

[1] parts by weight per hundred parts rubber (i.e. fluoroelastomer)
[2] #150 (available from Kyowa Chemical)
[3] hydrous bismuth oxide nitrate available from Toagosei Chemical Industry Co., Ltd.
[4] a mixture of bisphenol AF and a quaternary phosphonium salt available from DuPont.
[5] Viton ® process aid #2, available from DuPont.

Example 2 and Comparative Example B

Curable compositions for Example 2 and Comparative Example B were made by compounding the ingredients in an internal laboratory mixer and sheet off mill. Formulations are shown in Table II.

The compositions were molded into slabs (for volume swell testing) and pellets and press cured at 160° C. for 15 minutes.

Coupons made from cured slabs were exposed to a biodiesel fuel mixture of 70/30/1 volume ratio petroleum diesel/RME (rape seed oil methyl ester)/water at 125° C. for the time indicated in a closed container. Results are shown in Table II. Other coupons were exposed to an acid mixture (100 ppm sulfuric, 100 ppm nitric, 100 ppm hydrochloric, 1000 ppm acetic and 1000 ppm formic acid) at 60° C. for the indicated time.

TABLE II

| | Ex. 2 | Comp. Ex. B |
|---|---|---|
| Ingredient, phr | | |
| FKM1 | 100 | 100 |
| Ca(OH)$_2$ | 0 | 3 |
| MgO | 0 | 6 |
| Bismuth oxide S[1] | 10 | 0 |
| Carbon black N990 | 30 | 30 |
| VC50 | 2.5 | 2.5 |
| VPA #2 | 0.5 | 0.5 |
| % Volume swell in biodiesel | | |
| 72 hours | 1.2 | 5.1 |
| 168 hours | 1.9 | 14.2 |
| 336 hours | 2.7 | 22.8 |
| 672 hours | 3.1 | 41.5 |
| 1008 hours | 3.0 | 62.7 |
| Volume swell in acid mixture | | |
| 72 hours | 0.6 | 4.8 |
| 168 hours | 1.0 | 9.2 |
| 336 hours | 1.5 | 16.9 |

[1]precipitated bismuth oxide available from Nihon-kagaku-sangyo

Examples 3 and 4 and Comparative Examples C and D

Curable compositions for Examples 3 and 4 and Comparative Examples C and D were made by compounding the ingredients in an internal laboratory mixer and sheet off mill. Formulations are shown in Table III.

The compositions were molded into slabs (for volume swell testing) and pellets and press cured at 160° C. for 15 minutes.

Coupons made from cured slabs were exposed to an acid mixture (100 ppm sulfuric, 100 ppm nitric, 100 ppm hydrochloric, 1000 ppm acetic and 1000 ppm formic acid) at 60° C. for the indicated time. Volume swell is shown in Table III.

TABLE III

| | Ex. 3 | Ex. 4 | Comp. Ex. C | Comp. Ex. D |
|---|---|---|---|---|
| Ingredient, phr | | | | |
| FKM2 | 100 | 100 | 100 | 100 |
| Peroxide[1] | 1.5 | 1.5 | 1.5 | 1.5 |
| Coagent[2] | 2.5 | 2.5 | 2.5 | 2.5 |
| IXE-550 | 5 | 0 | 0 | 0 |
| Bismuth oxide S | 0 | 5 | 0 | 0 |
| ZnO | 0 | 0 | 3 | 0 |
| Carbon black N990 | 30 | 30 | 30 | 30 |
| VPA #2 | 0.5 | 0.5 | 0.5 | 0.5 |
| Volume swell in acid mixture | | | | |
| 168 hours | 1.7 | 1.9 | 6.4 | 2.3 |
| 336 hours | 2.0 | 2.1 | 9.3 | 2.8 |
| Metal Corrosion | No | No | No | Yes |

[1]perhexa25B40 available from Nichiyu.
[2]Diak 7 triallyl isocyanurate available from DuPont.

Example 5 and Comparative Examples E and F

Curable compositions for Example 5 and Comparative Examples E and F were made by compounding the ingredients in an internal laboratory mixer and sheet off mill. Formulations are shown in Table IV.

The compositions were molded into slabs (for volume swell testing) and pellets and press cured at 177° C. for 10 minutes, followed by a 4 hour post cure in an oven at 232° C.

Coupons made from cured slabs were exposed to 70% nitric acid at 70° C. for 70 hours. Volume change is shown in Table IV.

TABLE IV

| Ingredient, phr | Comp. Ex. E | Ex. 5 | Comp. Ex. F |
|---|---|---|---|
| FKM3 | 100 | 100 | 100 |
| Peroxide[1] | 1.5 | 1.5 | 1.5 |
| Coagent[2] | 3 | 3 | 3 |
| Bismuth oxide[3] | 0 | 15 | 0 |
| MgO[4] | 15 | 0 | 6 |
| Carbon black N990 | 8 | 8 | 8 |
| Volume swell in acid | 85.5 | 20.3 | 49.4 |

[1]Varox ® DBPH-50 available from R. T. Vanderbilt
[2]Diak 7 triallyl isocyanurate available from DuPont
[3]available from Aldrich
[4]Elastomag 170 available from Akrochem

Comparative Examples G-K

Example 2 was repeated except that bismuth oxide was replaced with other metal oxides in the compositions. Comparative Example G contained 10 phr tin monoxide S (Nihon-kagaku-sangyo), Comparative Example H contained 10 phr tin dioxide SH (Nihon-kagaku-sangyo), Comparative Example I contained 10 phr α-alumina A32 (Nihon keikinzoku), Comparative Example J contained 10 phr γ-alumina C20 (Nihon keikinzoku), Comparative Example K contained 15 phr active alumina AA101 (Nihon keikinzoku), Comparative Example L contained 15 phr titanium dioxide, anatase (Kanto kagaku), Comparative Example M contained 15 phr titanium dioxide, rutile (Kanto kagaku), and Comparative Example N contained 15 phr zirconium oxide UEP (Daiichi kizenso kagaku). None of these comparative compositions cured. Thus, volume swell could not be measured.

What is claimed is:
1. A curable fluoroelastomer composition comprising:
A) a curable fluoroelastomer;
B) a curative; and

C) an acid acceptor selected from the group consisting of a hydrous bismuth oxide nitrate compound and bismuth oxide.

2. The curable fluoroelastomer composition of claim 1 wherein said acid acceptor is a hydrous bismuth oxide nitrate compound.

3. The curable fluoroelastomer composition of claim 1 wherein said acid acceptor is bismuth oxide.

4. The curable fluoroelastomer composition of claim 1 wherein said curative is a polyhydroxy compound.

5. The curable fluoroelastomer composition of claim 1 wherein said curative is a diamine.

6. The curable fluoroelastomer composition of claim 1 wherein said curative is an organic peroxide.

* * * * *